June 5, 1945.   G. P. WILSON ET AL   2,377,597
METALLURGICAL APPARATUS
Filed Dec. 14, 1942   2 Sheets-Sheet 1

INVENTORS
Golder P. Wilson & Edward Hartshorne
BY  Lionel E. Doff
ATTORNEY

June 5, 1945.　　G. P. WILSON ET AL　　2,377,597
METALLURGICAL APPARATUS
Filed Dec. 14, 1942　　2 Sheets-Sheet 2

INVENTORS
Golder P. Wilson & Edward Hartshorne
BY Lionel E. Goff
ATTORNEY

Patented June 5, 1945

2,377,597

UNITED STATES PATENT OFFICE 2,377,597

METALLURGICAL APPARATUS

Golder P. Wilson, Alton, and Edward Hartshorne, Godfrey, Ill., assignors to Olin Industries, Inc., a corporation of Delaware Application December 14, 1942, Serial No. 469,014

15 Claims. (Cl. 266—27)

This invention relates to melting furnaces and in particular to furnaces for melting metal.

The usual electric induction furnace consists essentially of a pot for receiving the material to be melted and holding the molten material, an electric coil adapted to heat the material by induction and means for tilting the pot to pour the molten metal into a mold. When such furnaces are used to melt metal cuttings, shavings and other scrap it is extremely difficult to charge the pot so as to achieve maximum melting capacity due to the bulkiness of such material. It is the usual practice to charge such furnaces by hand and it is well known that the charging of such bulky material tends greatly to slow down the speed of melting. Further, such scrap or raw material is often contaminated with combustible material such as oil or grease and the like which upon heating introduces large volumes of smoke and disagreeable fumes into the surrounding atmosphere and renders difficult the efficient operation of the furnace. Likewise, such fumes often carry constituents, such as zinc oxide, etc., which are susceptible of economic recovery.

It is therefore an object of this invention to provide improved means for charging such furnaces and for removing the gases evolved therefrom.

Another object is to provide improved means for facilitating the charging of such furnaces to full melting capacity.

Another object is to provide means for melting even the bulkiest of metal scrap with an efficiency similar to that obtained with large, compact pieces of metal.

Another object is to provide improved means for removing the gases evolved from such furnaces during both the melting and pouring or casting operations in order to permit the recovery of valuable constituents thereof.

Still another object is to provide an improved hood and feed means adapted to be attached to said furnaces to secure efficient operation thereof.

Another object is to provide such a furnace attachment with simple and positive means for fastening same to the furnace.

Figure 1:
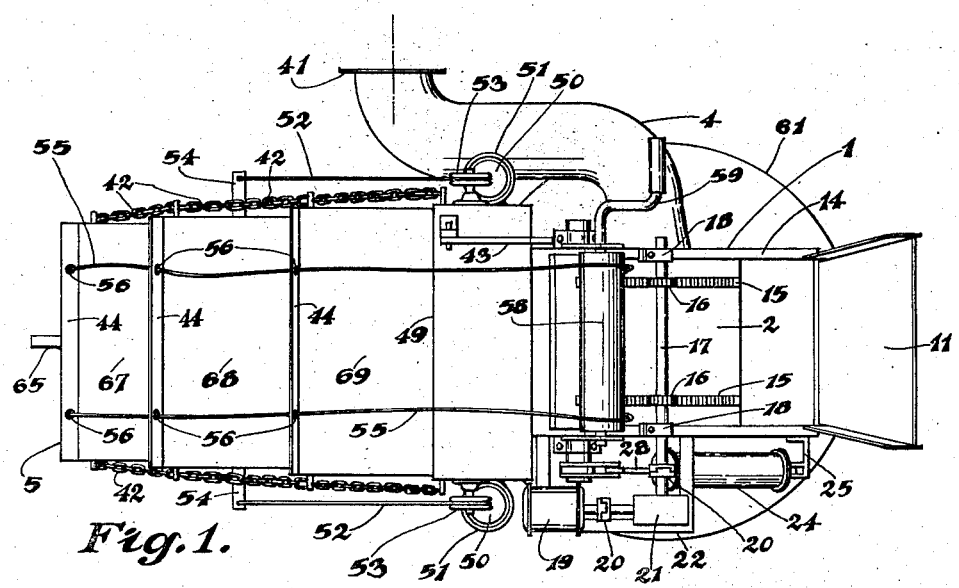
Figure 2:
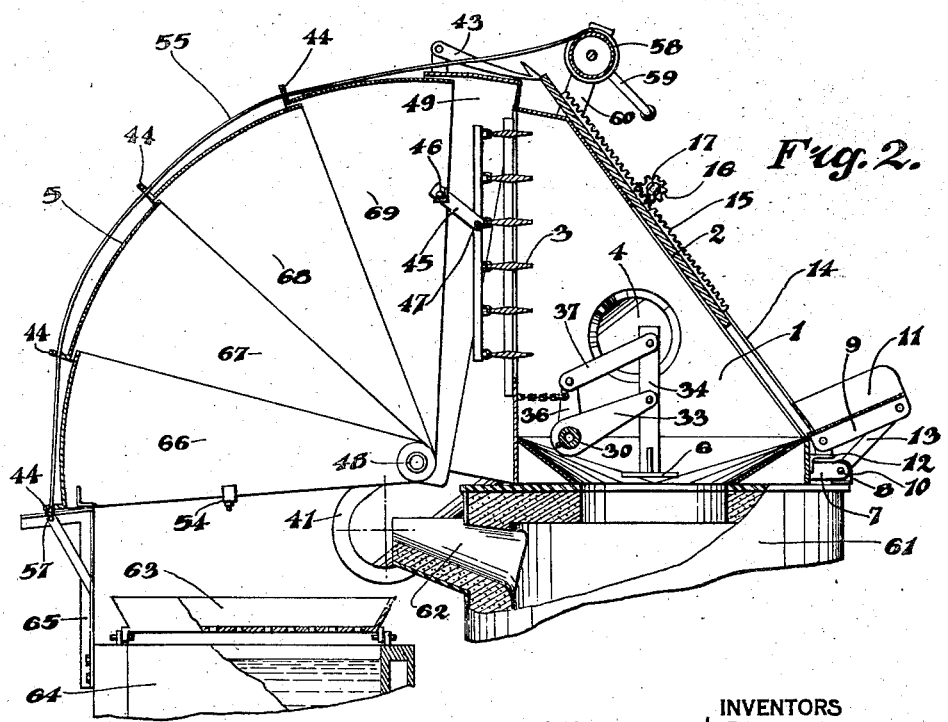
Figure 3:
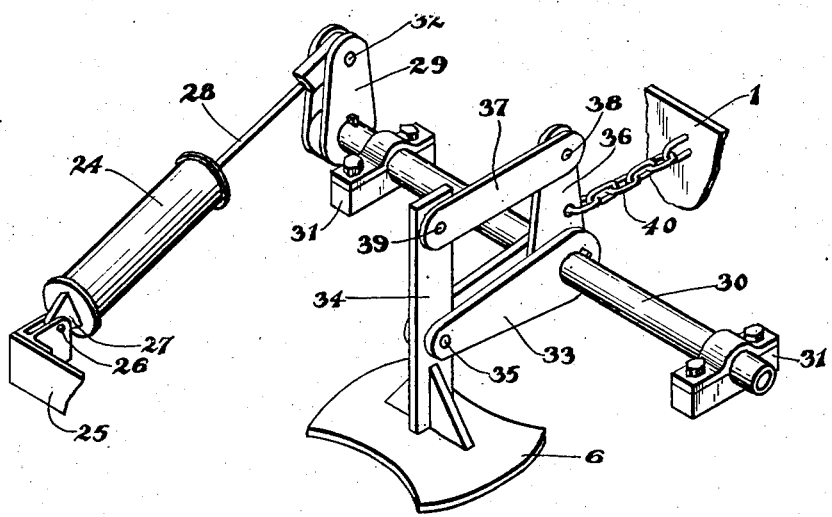
Figure 4:
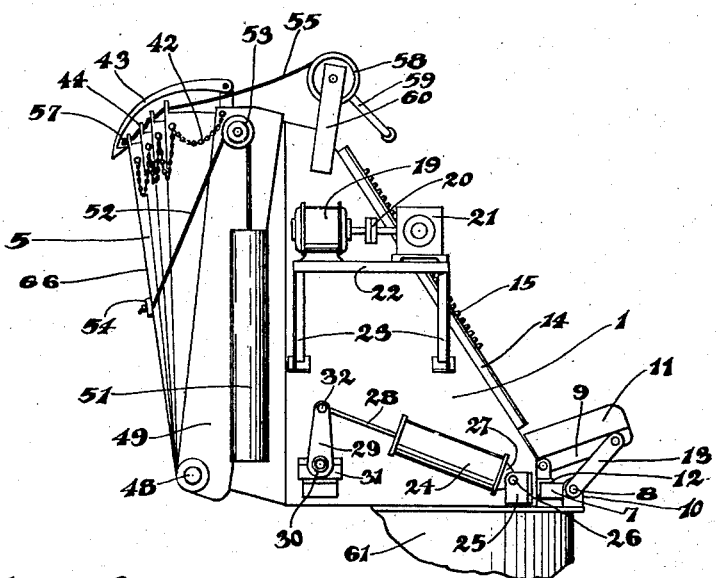

Other objects and advantages will become apparent from the following detail description and accompanying drawings, in which Figure 1 is a plan view of a furnace attachment illustrating an embodiment of this invention, and Figure 2 is a vertical sectional view of same, and Figure 3 is a detail plan view of a plunger operating mechanism, and Figure 4 is a side view of the furnace attachment, shown in Figure 1, when in position for charging the furnace.

The above objects and advantages are secured in accordance with this invention by providing an improved furnace attachment, which has the dual function of serving both as a fume hood and as a charging device, and is in the form of a hopper provided with means for discharging material from the hopper into the furnace, and means for receiving the fumes evolved during the furnace charging, melting and pouring operations.

One embodiment of the invention is illustrated in detail in the drawings, in which the hopper 1, Figure 2 is shown as provided with a charging door 2, a fume door 3, a fume duct 4, an extendible compartment 5, and a plunger 6. In operating position the hopper 1 is set on top of the furnace 61 with the open bottom of the hopper centered over the open mouth of the furnace, the compartment 5 of the hopper being positioned on the pouring side of the furnace 62. After the attachment is positioned on the furnace, it is fastened to the furnace to prevent it from being dislocated when the furnace is tilted during a pouring operation. The attachment may be fastened to the furnace in any suitable manner, but is preferably fastened on the charging side of the furnace by the relatively simple means illustrated in Figures 2 and 4, in which the lugs 7 carried by the hopper 1 are fastened by means of bolts 8 to the anchors 10 carried by the furnace 61. The charging chute 11 is supported by angle supports 9 and 12 and by legs 13. The legs 13 are fastened, along with lugs 7, to the anchors 10 by means of bolts 8, and, since this connection is necessary in order for the chute 11 to be in a charging position, there is very little possibility that the furnace will be charged and tilted in a pouring operation without the hopper being attached to the furnace.

The sliding door 2, Figure 1, is moved up and down in the door slide-way 14 by means of the rack 15 and pinion 16 which is mounted on the door operating shaft 17 held in bearings 18, said shaft 17 being operated by means of motor 19, couplings 20, and gears 21. The motor 19 and gears 21 are mounted on hopper 1 by means of the platform 22 and braces 23, Figure 4.

Air piston 24, Figure 3, is operated by means of compressed air from any suitable source and is movably mounted on support 25, carried by hopper 1, by means of lugs 27 and pin 26. The piston rod 28 is movably connected to drive lever 29 by means of pin 32. The drive lever 29 is keyed to plunger drive shaft 30 which is supported in bearings 31 mounted in hopper 1. Plunger lever 33 is also keyed to drive shaft 30 and is movably connected at the other end to plunger rod 34 by means of pin 35. Guide lever 36 is movably mounted on shaft 30 and movably connected at the other end to connecting link 37 by means of pin 38. The other end of connecting link 37 is movably connected to plunger rod 34 by means of pin 39 and the plunger 6 is at the bottom of the plunger rod 34. A restricting link 40 is attached at one end to the wall of the hopper 1 and at the other end to the guide lever 36. By providing such a drive linkage for the plunger 6, it is possible to obtain a substantially vertical up and down movement of the plunger through the bottom of the hopper and mouth of the furnace.

Fume duct 4, Figures 1 and 2, is mounted on the hopper 1 and is adapted to remove the fumes received in the hopper and from compartment 5 through fume door 3. The fume duct 4 is so arranged as to terminate at the point of pivot of the furnace during a pouring operation, the pivot point being near the pouring lip 62, and is provided with a flange 41 at the end for the purpose of making a movable joint or connection with any suitable fume line or flue, the fume line preferably being provided with a suction fan to aid in drawing the fumes through fume duct 4.

Extendible compartment 5, Figure 2, having sections 66, 67, 68 and 69 capable of telescoping into plate 49, is adapted to be collapsed and held out of the way against the wall of the hopper during a charging and pouring operation by means of latch 43 engaging the stiffener plates 44, Figure 4. The extension and collapsing of the sections of compartment 5 are facilitated by means of the counterweights 50 guided by the guards 51, Figures 1 and 4, acting through cables 52, which pass over pulleys 53 and are attached to the bracket 54 on section 66, to balance the weight of the sections of compartment 5. The sections of the compartment or hood 5 can thus be easily extended by hand after latch 43 is raised. In order to collapse or telescope the sections, a windlass arrangement may be provided, which, for instance as illustrated in Figures 1, 2 and 3 may consist of a drum 58 and crank 59 mounted on the hopper 1 by means of supports 60 with the cables 55 passing through the perforations 56 in stiffener plates 44 and attached to section 66 at 57. The sections of compartment 5 may thus be telescoped merely by turning crank 59 to wind cables 55 up on drum 58. The sections 66, 67, 68 and 69 are pivoted about the hinge pin 48 mounted in plate 49 and are provided with restricting links 42 to prevent the sections from completely separating.

The fume door 3 for permitting the fumes from compartment 5 to enter the fume duct 4 may be of any suitable form, such as a swinging door, and as shown at 3, Figure 2, is a shutter arrangement, which is opened by an extension of compartment 5 and closed by the telescoping of compartment 5 by means of the door lever 45 which is attached to section 69 by pin 46 and to the door 3 by pin 47.

In operation, after the hopper has been positioned on and fastened to the furnace and the duct 4 has been connected at 41 to a suitable fume line, the charging door 2 is raised by motor 19, plunger 6 is raised up into the interior of the hopper by operating the air piston 24, compartment 5 is collapsed by means of crank 59 and retained in collapsed position by means of latch 43 and fume door 3 is thereby maintained in closed position. The material to be melted is then placed on chute 11 and falls by gravity into hopper 1. Plunger 6 is then lowered as often as necessary by the operation of air piston 24 to force the material through the open bottom of the hopper 1 down into the mouth of the furnace 61 and during the last stages of the charging operation under the surface of the molten metal in the furnace. With bulky material it is frequently necessary to charge a multiple number of times in order to fill the furnace to full melting capacity. After charging, the door 2 is lowered by means of motor 19 and the melting process is continued as usual until the charge is ready for pouring. Any fumes evolved from the furnace during the charging and melting operations are removed from the hopper through the fume duct 4.

When the charge is ready for pouring, the latch 43 is raised and the compartment 5 is extended so that section 66 rests on the support 65 which is attached to mold 64 and fume door 3 is thereby opened. The furnace is then tilted, the pivot point being at the edge of the pouring lip 62, to pour the metal from the pouring lip into the mold 64, for instance through a pouring box 63. The fumes from the pouring lip 62 and mold 64 are drawn into the compartment 5 and into the fume duct 4 through fume door 3.

After the pouring operation is completed, the furnace is again returned to vertical position and the compartment 5 can then be collapsed, for instance by means of crank 59, and held out of the way in collapsed position by means of latch 43, the door 3 then being closed.

In a charging operation, as the material to be melted is fed onto the chute 11 it falls by gravity into and through the bottom of the hopper 1 and into the furnace 61. As more and more bulky scrap is fed into the furnace, a portion in the interior of the furnace melts, but the unmelted material piles up to partially fill the hopper 1, at which time the plunger 6 is operated to push the material out of the hopper and into the molten metal in the furnace. In order to melt at maximum speed this bulky material must be forced through the surface of the molten bath in the furnace and be wetted by it. This gives a rapid transfer of heat to the charged material and increases the melting efficiency of the furnace.

The process of feeding material into hopper 1 and pressing it into the furnace with plunger 6 is repeated as often as necessary until the charge is complete. Frequently, however, it is necessary to charge a furnace with scrap metal that is extremely bulky and formed of such hard resilient pieces that it is not easily pressed into the furnace. In accordance with this invention it is possible to give such scrap more or less of a heat treatment to soften it and render it compressible before charging it into the furnace. This can be accomplished by feeding the scrap into the hopper 1 where it is subject to the heat from the open mouth of the furnace and permitting it to remain in the hopper 1 until the required heat treatment is accomplished, whereupon it is then pushed into the furnace with the plunger 6, and the melting continued as in accordance with normal practice.

As indicated in the detail description above, the extendible compartment may be made large enough to cover the whole top of the mold and thus recive all the fumes issuing therefrom and is adapted to telescope against the wall of the hopper and thus leave the space on the pouring side of the furnace free for the purpose of cleaning, moving the molds into place, etc. The plunger is adapted to transfer the material from the hopper well down into the furnace in order to increase the melting efficiency thereof.

The fumes entering the fume duct may be conducted to any apparatus suitable for removing the valuable constituents or may be disposed of in any suitable manner. For instance where the fumes carry zinc oxide, the zinc oxide particles may be recovered by passing the fumes through porous bags.

Thus in accordance with this invention, an improved furnace attachment is provided for inserting a charge into and removing fumes from furnaces so as to facilitate the economic and efficient operation thereof.

It is to be understood that various changes may be made in the specific details set forth herein without departing from the spirit and scope of the invention and that the invention is therefore not to be limited to such details except as set forth in the appended claims.

Having thus described the invention in detail, what is claimed and desired to be secured by Letters Patent of the United States is:

1. An attachment for a melting furnace provided with a pouring lip for discharging molten metal comprising means for holding the material to be charged into the furnace and adapted to receive the fumes from the furnace, said holding means being provided with means for transferring said material into the furnace and with means for receiving the fumes evolved during a furnace discharging operation.

2. An attachment for a melting furnace provided with a pouring lip for discharging molten metal comprising means for holding the material to be charged into the furnace and adapted to be mounted over the open mouth of and receive the fumes from the furnace, said holding means being provided with means for transferring said material into the furnace and with means for receiving the fumes evolved during a furnace discharging operation.

3. An attachment for a melting furnace provided with a pouring lip for discharging molten metal comprising a hopper for holding the material to be treated and adapted to be mounted over the open mouth of and receive the fumes from the furnace, said hopper being provided with means for forcing the materials through an opening in the bottom thereof and into the furnace and with means for receiving the fumes evolved during the furnace discharging operation.

4. An attachment for a melting furnace provided with a pouring lip for discharging molten metal comprising a hopper provided with means for receiving the material to be melted, with means for discharging said material into the furnace, and with means for receiving the fumes evolved during the furnace charging, melting, and pouring operations.

5. An attachment for a melting furnace provided with a pouring lip for discharging molten metal comprising a hopper for holding the material to be charged into the furnace and adapted to receive the fumes from the furnace, said hopper being provided with means for transferring said material into the furnace and with means for receiving the fumes evolved during a furnace discharging operation.

6. An attachment for a melting furnace provided with pouring means for discharging molten material comprising a hopper for holding the material to be treated and adapted to be mounted over the open mouth of and receive the fumes from a furnace, said hopper being provided with means for transferring said material into the furnace and with an extendible compartment adapted to receive and deliver thereinto the fumes evolved during a discharging operation.

7. An attachment for a melting furnace provided with pouring means for discharging molten material comprising a hopper for holding the material to be treated and adapted to be mounted over the open mouth of and receive the fumes from the furnace, said hopper being provided with means for forcing the said material through an opening in the bottom thereof and into the furnace and with an extendible compartment adapted to receive and deliver thereinto the fumes evolved during a discharging operation and with a fume duct adapted to remove the fumes therefrom.

8. An attachment for a melting furnace provided with pouring means for discharging molten material comprising a hopper for holding the material to be treated and adapted to be mounted over the open mouth of and receive the fumes from a furnace, said hopper being provided with plunger means for forcing the said materials through an opening in the bottom thereof and into the furnace, with an extendible compartment adapted to receive and deliver thereinto the fumes evolved during a discharging operation, and with a fume duct adapted to remove the fumes therefrom.

9. An attachment for a melting furnace provided with pouring means for discharging molten material comprising an open bottomed hopper adapted to be mounted over the open mouth of and receive the fumes from the furnace, said hopper being provided with a door for receiving the material to be melted, with a plunger movably mounted therein and adapted to push said material through the opening in the bottom thereof and down into the furnace, with an extendible compartment adapted to receive the fumes from a mold during a pouring operation, with a door for receiving the fumes from said compartment and with a fume duct to remove the fumes therefrom.

10. An attachment for a melting furnace provided with pouring means for discharging molten material comprising a hopper having an open bottom adapted to be mounted over the open mouth of and receive the fumes from the furnace, said hopper being provided with a door for receiving the material to be melted, with a plunger movably mounted therein, with means for operating said plunger to push said material through the opening in the bottom thereof and into said furnace, with a compartment having telescoping sections adapted to be extended during a pouring operation to receive the fumes from the mold, with a door for receiving the fumes from said compartment, and with a fume duct for removing the fumes therefrom.

11. In a furnace for melting metal, provided with a pouring lip for discharging molten metal, a hopper comprising the combination of means for receiving and holding the material to be melted, means for transferring said material into the furnace, and means for receiving the fumes evolved during the furnace charging, melting and pouring operations.

12. Apparatus for melting metal comprising in combination, a melting furnace, means for pouring the molten metal from said furnace, means for receiving the molten metal, a hopper for receiving and transferring the material to be melted into the furnace, and means for drawing into said hopper the fumes evolved during the furnace charging, melting and pouring operations.

13. Apparatus for melting metal, comprising in combination, an electric melting furnace, means for pouring the molten metal from said furnace, means for receiving the molten metal, a hopper having an open bottom mounted over the open mouth of said furnace and adapted to receive the material to be melted, plunger means for transferring said material from said hopper into said furnace, an extendible hood on said hopper having telescoping sections adapted to be extended to receive the fumes evolved during a pouring operation, a door intermediate said hood and hopper, and means for drawing into said hopper and removing therefrom the fumes evolved during the furnace charging, melting and pouring operations.

14. An attachment for a melting furnace provided with a pouring lip for discharging molten metal comprising holding means for the material to be charged into the furnace adapted to receive all fumes from the furnace, means for transferring the material into the furnace, means for removing the fumes from said holding means, receiving means for all fumes evolved during a furnace discharging operation, and means for removing the fumes from said receiving means.

15. An attachment for a melting furnace provided with a pouring lip for discharging molten metal comprising the combination of a hopper for holding the metal to be melted and adapted to be mounted over the open mouth of and receive all fumes from the furnace during a charging and melting operation, means for transferring said metal into the furnace, means for removing the fumes from said hopper, a compartment for receiving all fumes evolved during a furnace discharging operation, and means for removing the fumes from said compartment.

GOLDER P. WILSON.
EDWARD HARTSHORNE.